United States Patent

Ovshinsky et al.

[11] Patent Number: 6,086,843
[45] Date of Patent: Jul. 11, 2000

[54] STRUCTURALLY MODIFIED NICKEL HYDROXIDE MATERIAL AND METHOD FOR MAKING SAME

[75] Inventors: Stanford R. Ovshinsky, Bloomfield Hills; Boyko Aladjov, Rochester Hills; Rosa T. Young, Troy; Srinivasan Venkatesan, Sourthfield; Subhash K. Dhar, Bloomfield Hills, all of Mich.

[73] Assignee: Ovonic Battery Company, Inc., Troy, Mich.

[21] Appl. No.: 09/153,692

[22] Filed: Sep. 15, 1998

[51] Int. Cl.$^7$ .............................. C01B 13/36; H01M 4/32
[52] U.S. Cl. ............................. 423/594; 429/223
[58] Field of Search ........................ 429/223; 423/594; 252/521.2; 205/60

[56] References Cited

U.S. PATENT DOCUMENTS

| | | |
|---|---|---|
| 4,844,999 | 7/1989 | Oshitani et al. ........................ 429/223 |
| 5,498,403 | 3/1996 | Shin ..................................... 429/223 X |
| 5,569,444 | 10/1996 | Blanchard et al. .................. 429/223 X |
| 5,773,169 | 6/1998 | Matsuda et al. ........................ 429/223 |
| 5,788,943 | 8/1998 | Aladjov .............................. 429/223 X |
| 5,905,003 | 5/1999 | Young et al. ........................... 429/223 |

Primary Examiner—Maria Nuzzolillo
Assistant Examiner—Susy Tsang
Attorney, Agent, or Firm—Philip H. Schlazer; Marvin S. Siskind; David W. Schumaker

[57] ABSTRACT

A method for producing a structurally modified nickel hydroxide active material for the positive electrode of an alkaline electrochemical cell. The method comprises the steps of combining a nickel ion solution, an ammonium hydroxide solution, and an alkali metal hydroxide solution to form a reaction mixture; and cycling the supersaturation of the reaction mixture.

6 Claims, 1 Drawing Sheet

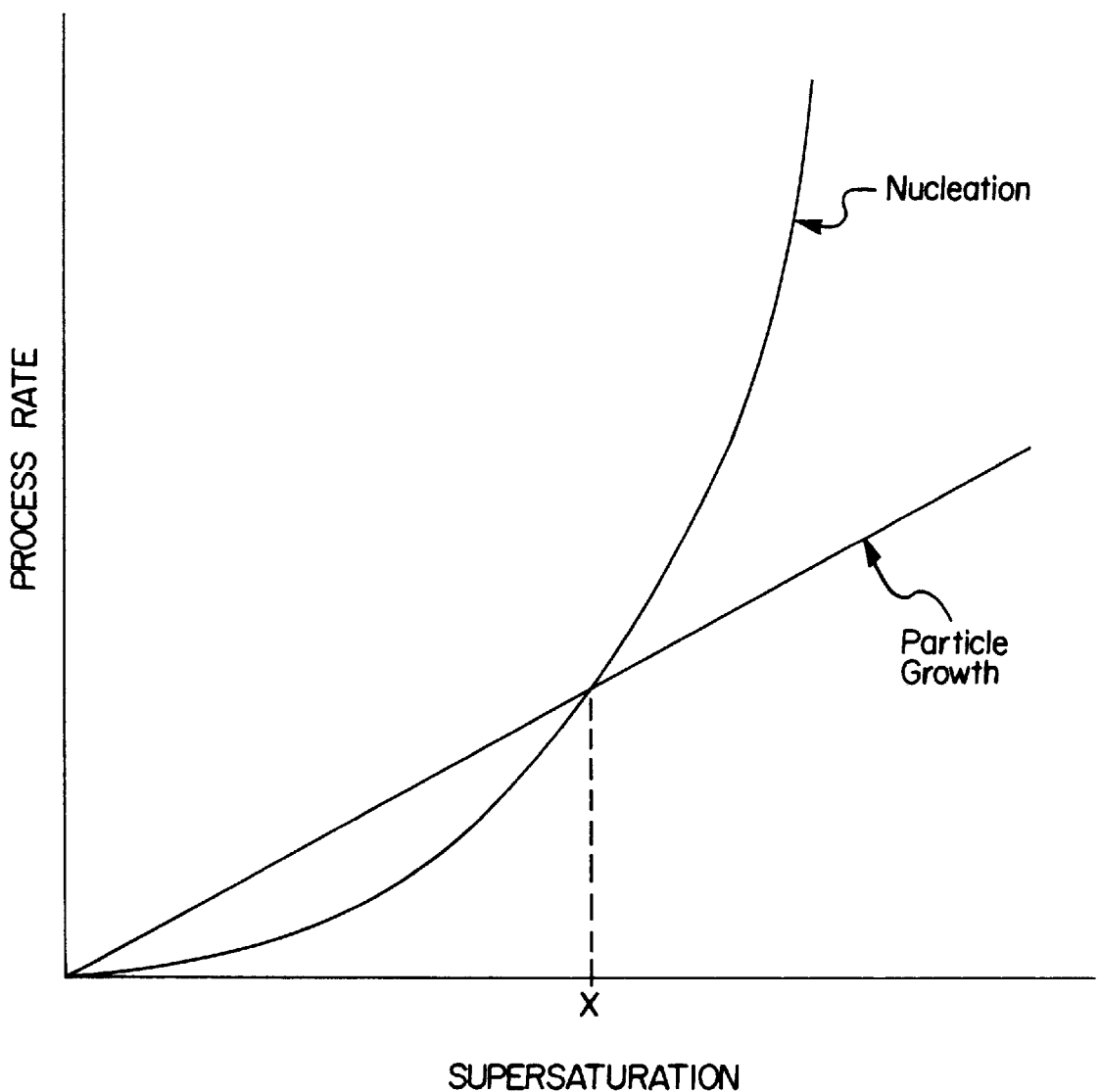

STRUCTURALLY MODIFIED NICKEL HYDROXIDE MATERIAL AND METHOD FOR MAKING SAME

FIELD OF THE INVENTION

The instant invention relates generally to nickel hydroxide materials for the positive electrode of an alkaline electrochemical cell, and specifically to structurally modified nickel hydroxide materials.

BACKGROUND OF THE INVENTION

In rechargeable alkaline electrochemical cell, weight and portability are important considerations. It is also advantageous for rechargeable alkaline batteries to have long operating lives without the necessity of periodic maintenance. Rechargeable alkaline electrochemical cells are used in numerous consumer devices such as calculators, portable radios, and cellular phones. They are often configured into a sealed power pack that is designed as an integral part of a specific device. Rechargeable alkaline electrochemical cells can also be configured as larger "cell packs" or "battery packs" that can be used, for example, in industrial, aerospace, and electronics.

Examples of alkaline electrochemical cells are nickel cadmium cells (Ni—Cd) and nickel-metal hydride cells (Ni—MH). Ni—MH cells use a negative electrode having a metal hydride active material capable of the reversible electrochemical storage of hydrogen. Ni—MH cells typically use a positive electrode having nickel hydroxide as the active material. The negative and positive electrodes are spaced apart in an alkaline electrolyte. Upon application of an electrical potential across a Ni—MH cell, the metal hydride material of the negative electrode is charged by the electrochemical absorption of hydrogen and the electrochemical discharge of a hydroxyl ion, as shown in equation (1):

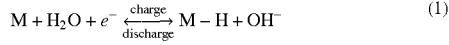

$$M + H_2O + e^- \underset{discharge}{\overset{charge}{\rightleftarrows}} M-H + OH^- \quad (1)$$

The negative electrode reactions are reversible. Upon discharge, the stored hydrogen is released to form a water molecule and release an electron.

Initially Ovshinsky and his teams focused on metal hydride alloys that form the negative electrode. As a result of their efforts, they were able to greatly increase the reversible hydrogen storage characteristics required for efficient and economical battery applications, and produce batteries capable of high density energy storage, efficient reversibility, high electrical efficiency, efficient bulk hydrogen storage without structural changes or poisoning, long cycle life, and repeated deep discharge. The improved characteristics of these "Ovonic" alloys, as they are now called, results from tailoring the local chemical order and hence the local structural order by the incorporation of selected modifier elements into a host matrix. Disordered metal hydride alloys have a substantially increased density of catalytically active sites and storage sites compared to single or multi-phase crystalline materials. These additional sites are responsible for improved efficiency of electrochemical charging/discharging and an increase in electrical energy storage capacity. The nature and number of storage sites can even be designed independently of the catalytically active sites. More specifically, these alloys are tailored to allow bulk storage of the dissociated hydrogen atoms at bonding strengths within the range of reversibility suitable for use in secondary battery applications.

Some extremely efficient electrochemical hydrogen storage materials were formulated, based on the disordered materials described above. These are the Ti—V—Zr—Ni type active materials such as disclosed in U.S. Pat. No. 4,551,400 ("the '400 Patent") to Sapru, Hong, Fetcenko, and Venkatesan, the disclosure of which is incorporated by reference. These materials reversibly form hydrides in order to store hydrogen. All the materials used in the '400 Patent utilize a generic Ti—V—Ni composition, where at least Ti, V, and Ni are present and may be modified with Cr, Zr, and Al. The materials of the '400 Patent are multiphase materials, which may contain, but are not limited to, one or more phases with $C_{14}$ and $C_{15}$ type crystal structures.

Other Ti—V—Zr—Ni alloys are also used for rechargeable hydrogen storage negative electrodes. One such family of materials are those described in U.S. Pat. No. 4,728,586 ("the '586 Patent") to Venkatesan, Reichman, and Fetcenko, the disclosure of which is incorporated by reference. The '586 Patent describes a specific sub-class of these Ti—V—Ni—Zr alloys comprising Ti, V, Zr, Ni, and a fifth component, Cr. The '586 Patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them.

In contrast to the Ovonic alloys described above, the older alloys were generally considered "ordered" materials that had different chemistry, microstructure, and electrochemical characteristics. The performance of the early ordered materials was poor, but in the early 1980's, as the degree of modification increased (that is as the number and amount of elemental modifiers increased), their performance began to improve significantly. This is due as much to the disorder contributed by the modifiers as it is to their electrical and chemical properties. This evolution of alloys from a specific class of "ordered" materials to the current multicomponent, multiphase "disordered" alloys is shown in the following patents: (i) U.S. Pat. No. 3,874,928; (ii) U.S. Pat. No. 4,214,043; (iii) U.S. Pat. No. 4,107,395; (iv) U.S. Pat. No. 4,107,405; (v) U.S. Pat. No. 4,112,199; (vi) U.S. Pat. No. 4,125,688 (vii) U.S. Pat. No. 4,214,043; (viii) U.S. Pat. No. 4,216,274; (ix) U.S. Pat. No. 4,487,817; (x) U.S. Pat. No. 4,605,603; (xii) U.S. Pat. No. 4,696,873; and (xiii) U.S. Pat. No. 4,699,856. (These references are discussed extensively in U.S. Pat. No. 5,096,667 and this discussion is specifically incorporated by reference). Ni—MH materials are also discussed in detail in U.S. Pat. No. 5,277,999 to Ovshinsky, et al., the contents of which are incorporated by reference.

Nickel hydroxide has been used for many years as an active electrode material for the positive electrode of alkaline electrochemical cells. The reactions that take place at the nickel hydroxide positive electrode of a Ni—MH electrochemical cell are shown in equation (2):

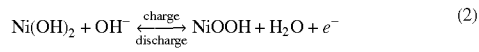

$$Ni(OH)_2 + OH^- \underset{discharge}{\overset{charge}{\rightleftarrows}} NiOOH + H_2O + e^- \quad (2)$$

The positive electrodes are typically pasted nickel electrodes which consist of nickel hydroxide particles in contact with a conductive substrate. The conductive substrate is typically a porous foam comprising nickel or a nickel alloy. A nickel hydroxide positive electrode ideally possesses the attributes of: 1) high discharge capacity; 2) high charge acceptance and utilization; 3) high electrical conductivity; and, 4) long cycle life.

Conventionally, the nickel hydroxide electrode reaction has been considered to be a one electron process involving oxidation of divalent nickel hydroxide to trivalent nickel oxyhydroxide on charge and subsequent discharge of trivalent nickel oxyhydroxide to divalent nickel hydroxide, as shown in equation (2). Recent evidence suggests that quadrivalent nickel is involved in the nickel hydroxide redox reaction; however, full utilization of quadrivalent nickel has never been achieved.

In practice, electrode capacity beyond the one-electron transfer theoretical capacity is not usually observed. One reason for this is incomplete utilization of the active material due to electronic isolation of oxidized material. Because reduced nickel hydroxide material has a high electronic resistance, the reduction of nickel hydroxide adjacent the current collector forms a less conductive surface that interferes with the subsequent reduction of oxidized active material that is farther away.

Ovshinsky and his teams have developed positive electrode materials that have demonstrated reliable transfer of more than one electron per nickel atom. Such materials are described in U.S. Pat. No. 5,344,728, U.S. Pat. No. 5,348,822, U.S. Pat. No. 5,569,563 and U.S. Pat. No. 5,567,549. The disclosures of U.S. Pat. Nos. 5,344,728, 5,348,822, 5,569,563 and 5,567,549 are incorporated by reference herein. Many of these materials involve gamma phase cycling. Nickel hydroxide material that cycles between the beta(II) nickel hydroxide and gamma nickel oxyhydroxide crystalline phases provides for greater electrode capacity.

However, due to the difference in the volumetric densities between beta(II) nickel hydroxide and gamma nickel oxyhyroxide material, there is expansion and contraction of the material during charge and discharge cycling which can sometimes lead to irreversible damage to the positive electrodes. The expansion and contraction can cause the positive electrodes to swell during charging. This can reduce the number of charge/discharge cycles that the electrochemical cell can withstand by causing mechanical failures of the cell.

There is a need for a structurally modified nickel hydroxide material having microstructural and/or macrostructural modifications which can provide for high discharge capacity and increased utilization. There is also need for a nickel hydroxide material which can cycle between the beta(II) and gamma crystalline phases without significant material degradation.

SUMMARY OF THE INVENTION

One objective of the present invention is a method of producing nickel hydroxide which can create structural modifications in the nickel hydroxide crystals and replicate these modifications during particle growth.

Another objective of the present invention is a structurally modified nickel hydroxide material having high discharge capacity and increased utilization.

Yet another objective of the present invention is a nickel hydroxide material which can cycle between the beta(II) and gamma crystalline structures without significant material degradation.

These and other objectives are also satisfied by a method for producing a structurally modified nickel hydroxide active material for the positive electrode of an alkaline electrochemical cell, the method comprising the steps of: combining a nickel ion solution, an ammonium hydroxide solution, and an alkali metal hydroxide solution, whereby a reaction mixture is formed; and cycling the supersaturation of the reaction mixture.

These and other objectives are satisfied by a structurally modified nickel hydroxide material for the positive electrode of an electrochemical cell, the material having a structurally modified nickel hydroxide material for the positive electrode of an alkaline electrochemical cell, the material having a pore volume greater than about 0.02 cm$^3$/g.

These and other objectives are also satisfied by a structurally modified, gamma phase cycleable, nickel hydroxide material for the positive electrode of an electrochemical cell, the material having a macrostructure and a microstructure sufficient to substantially eliminate disintegration of said nickel hydroxide material during electrochemical cycling between gamma and beta crystalline structures.

BRIEF DESCRIPTION OF THE DRAWINGS

FIG. 1 shows the rates of nucleation and particle growth as a function of supersaturation.

DETAILED DESCRIPTION OF THE INVENTION

Disclosed herein is a method for producing a structurally modified nickel hydroxide material. Generally, the method comprises the steps of combining a nickel ion solution, an ammonium hydroxide solution, and an alkali metal hydroxide to form a reaction mixture; and cycling the supersaturation of the reaction mixture.

Nickel hydroxide material may be prepared by combining a nickel ion solution with an alkali metal hydroxide. The reaction between the nickel ion solution and the alkali metal hydroxide results in the precipitation of the nickel hydroxide. The nickel hydroxide precipitate may be isolated, washed and dried. The nickel ion solution may be a nickel salt solution. The nickel salt solution may be a nickel nitrate solution, a nickel sulfate solution, a nickel chloride solution, or mixtures thereof.

Preferably, nickel hydroxide material is prepared by combining the nickel ion solution with an ammonium hydroxide solution so that a nickel-ammonium complex is formed. When the nickel-ammonium complex reacts with the alkali metal hydroxide, a spherically-shaped nickel hydroxide precipitate is grown.

The reaction between the nickel ion solution, the alkali metal hydroxide, and the ammonium hydroxide solution may be carried out simultaneously in a single reactor vessel. Preferably, the nickel ion solution and the ammonium hydroxide solution are premixed together in a first reactor vessel to form the nickel-ammonium complex. The nickel-ammonium complex is then mixed with the alkali metal hydroxide in a second reactor vessel to form the reaction mixture having a nickel hydroxide precipitate. In general, the method of producing the nickel hydroxide is not limited to a specific number of reaction vessels.

The method of the present invention includes the step of cycling the supersaturation of the reaction mixture that was formed by combining the nickel ion solution, ammonium hydroxide solution, and the alkali metal hydroxide. Generally, a solution is "saturated" when it contains the maximum amount of solute permitted by its solubility at specified conditions. Saturation is an equilibrium condition. A solution is "supersaturated" when it contains a concentration of solute in excess of that found in a saturated solution.

The "supersaturation" of a solution is the difference between the concentration of solute in solution at any instant of time and the equilibrium concentration in a saturated solution of the same solute. Supersaturation is a nonequilibrium condition and leads to precipitation as the reaction mixture attempts to relieve itself toward the equilibrium condition of saturation. The "relative supersaturation" is defined herein as the supersaturation divided by the equilibrium concentration of the solute.

The supersaturation of the reaction mixture may be cycled in many different ways. The supersaturation can be varied by either changing the concentration of solute in solution at any instant of time or by changing the equilibrium concentration in a saturated solution of the same solute. Hence, the supersaturation may be cycled by altering the pH, temperature, and/or pressure of the reaction mixture. The supersaturation may also be cycled by altering the concentrations of the reagents of the reaction mixture or by altering the stirring rate of the reagents. It is noted that any means of cycling the supersaturation of the reaction mixture is within the spirit and scope of the present invention.

A preferred way of cycling the supersaturation is by cycling the pH of the mixture. The pH of the reaction mixture may be cycled by cycling the volumetric amount of the alkali metal hydroxide solution added to the mixture. This may be done by cycling the flow of alkali metal hydroxide solution into the reaction mixture. This changes the pH of the reaction mixture in a continuous, cyclic fashion, thereby cycling the supersaturation. As the volumetric amount of the alkali metal hydroxide solution is increased, the pH of the mixture increases, and as the volumetric amount of the sodium hydroxide solution is decreased, the pH of the mixture decreases.

While not wishing to be bound by theory, it is believed that cycling the supersaturation of the reaction mixture changes the relative rates of nucleation and particle growth of the nickel hydroxide precipitate. Nucleation is a process which leads to the smallest particles that are capable of spontaneous growth. These minimum sized particles are called nuclei. For nucleation to start, a minimum number of ions or molecules must collect together, thus producing the starting nuclei for the particles. Generally, the rate at which these nuclei form increases with an increase in supersaturation. It is believed that the rate of nucleation may increase exponentially with the supersaturation of the reaction mixture. Particle growth is the growth of the nuclei that are already present in the reaction mixture. It is believed that particle growth may be directly proportional to the supersaturation of the reaction mixture.

FIG. 1 is a graph schematically showing the rates of nucleation and particle growth as a function of supersaturation. As shown in the graph, nucleation increases exponentially with supersaturation while particle growth increases linearly with supersaturation. Referring to FIG. 1, it is seen that the degree of supersaturation affects the relative rates of the two processes. For example, when the degree of supersaturation is less than point "x", particle growth is the dominant process resulting in a precipitate characterized by a small number of larger particles. When the degree of supersaturation is greater than point "x", nucleation is the dominant process resulting in a large number of smaller particles. Hence, the nature of the precipitate can be controlled by controlling the degree of supersaturation.

As discussed above, a preferred way of cycling the supersaturation is to change the pH of the solution. Increasing the pH increases the supersaturation of the reaction mixture. At higher pH values, the nickel hydroxide precipitation is in the "nucleation regime" whereby the ratio of the nucleation rate to growth rate is high. In this regime precipitation predominately forms many small crystallite nuclei and little crystalline growth on the nuclei occurs. On the other hand, decreasing the pH decreases the supersaturation of the reaction mixture. At lower pH values, the precipitation is in the so called "growth" regime whereby the ratio of nucleation rate to particle growth rate is low. In this regime, few nuclei are formed, and precipitation predominately causes growth of the previously formed crystallite nuclei.

Hence, as the pH of the precipitation reaction mixture is cycled, cycling also occurs between the growth phase and nucleation phase of the reaction continuum causing continuous variation in the ratio of the nucleation rate relative to the growth rate of the forming nickel hydroxide particles. While not wishing to be bound by theory, it is believed that this continuous variation in the relative rates of nucleation and growth creates internal imperfection and disorder, and imparts the unique microstructure and macrostructure of the nickel hydroxide material of the present invention.

U.S. Pat. No. 5,788,943, the "943" Patent, discloses a method of forming a structurally modified nickel hydroxide material by introducing external ultrasonic energy into the reaction mixture. It is noted that the "943" Patent fails to teach or suggest a method of making a structurally modified nickel hydroxide material by cycling the supersaturation.

The method described above produces a structurally modified nickel hydroxide material. Preferably, the nickel hydroxide is in the form of substantially spherical particles having microstructural and macrostructural modifications. "Macrostructural modification" is defined as the modification of one or more of the "macrostructural parameters" of the material. The macroscopic parameters of the material include pore area, pore volume, pore diameter, pore shape, pore distribution, average particle size, average particle shape, particle size distribution, BET surface area, and tap density. "Microstructural modification" is defined as the modification of one or more of the microscopic parameters of the material. The microscopic parameters of the material include, but are not limited to crystallite size, crystallite shape, and crystal lattice as determined by x-ray diffraction data.

Specifically, the nickel hydroxide material produced by the method disclosed herein has an increased pore volume. The pore volume of the material is preferably greater than about 0.02 $cm^3/g$, more preferably greater than about 0.025 $cm^3/g$, and most preferably greater than about 0.03 $cm^3/g$. The increased pore volume of the material may provide more space for individual crystallites to expand without coming into contact with other nickel hydroxide material. This also reduces internal particle stress and reduces or eliminates particle disintegration and/or destruction. The increased pore volume may also increase the electrolyte wetting of the nickel hydroxide particles, thereby increasing the utilization of the material.

It is noted that the tap density of the material is preferably greater than about 1.8 g/cc, and more preferably greater than about 1.9 g/cc.

The material may have a BET (Brunauer-Emmett-Teller) surface area which is preferably greater than about 14 $m^2/g$, more preferably greater than about 17 $m^2/g$, and most preferably greater than about 20 $m^2/g$. The material may also have a pore area which is preferably greater than about 0.5 $m^2/g$, more preferably greater than about 1.0 $m^2/g$, and most preferably greater than about 1.5 $m^2/g$.

A higher surface area material also results in a lower current density during charge/discharge cycling and greater charge acceptance. The material may have a specific capacity of at least 230 mAh/g. Further the material may have an electron transfer rate greater than about 1.0 electron per nickel atom.

The structurally modified material may have a smaller crystallite size than the prior art materials. The average crystallite size is preferably less than about 90 Angstroms.

The structural modifications of the nickel hydroxide material of the present invention may allow for expansion of the nickel hydroxide from the beta phase to the gamma phase with substantially no structural damage. The smaller crystallite size of the modified material may result in reduced and adsorbed crystallite expansion during gamma phase conversion. This reduces internal crystallite stress and fracturing, thereby increasing the flexibility of the crystallites and permit long term reversible beta phase nickel hydroxide to gamma phase nickel oxyhydroxide cycling. Materials having a larger average crystallite size will be more susceptible to crystallite destruction. It should be noted that the average crystallite size reported herein is in the <101> direction.

Chemical or compositional modifiers may be added to the structurally modified materials of the present invention. The nickel hydroxide material may contain one or more modifier elements selected from the group consisting of Al, Ba, Bi, Ca, Co, Cr, Cu, Fe, In, K, La, Li, Mg, Mn, Na, Nd, Pb, Pr, Ru, Sb, Sc, Se, Sn, Sr, Te, Ti, Y, Zn, and mixtures thereof. Useful combinations include nickel with Co, or Co and one or more of the other elements.

EXAMPLE

A nickel sulfate solution (about 10 wt %), a cobalt sulfate solution (about 8 wt %), and an ammonium hydroxide solution (about 29 wt %) are mixed in a first reaction vessel to form a nickel-ammonia complex having a pH of about 8.0. The nickel ammonium complex is then mixed with a sodium hydroxide solution in a second reaction vessel. The nickel ammonium complex is pumped into the second reactor vessel at a rate of about 76 ml per minute. The sodium hydroxide solution is pumped into the second reactor vessel on demand and the sodium hydroxide pump is turned on and off so that the pH of the sodium hydroxide solution cycles between about 12.3 and about 12.8. The reaction mixture is kept at a temperature of about 47° C. and stirred at a rate of about 760 rpm.

The nickel hydroxide material made by the method described above (i.e., cycling the pH of the reaction mixture) had the modified structural and performance characteristics shown in Table 1 below.

TABLE 1

| Property/Powder | with pH cycling |
| --- | --- |
| Crystallite Size (A) | 80 |
| Tap Density (g/cc) | 1.93 |
| BET Surface Area (m$^2$/g) | 20.83 |

TABLE 1-continued

| Property/Powder | with pH cycling |
| --- | --- |
| Pore Volume (cm$^3$/g) | 3.97 × 10$^{-2}$ |
| Pore Area (m$^2$/g) | 1.74 |
| Average Pore Radius (Å) | 38 |
| Average Particle Size ($\mu$m) | 11.8 |
| Paste Capacity (mAh/g) | 235 |

It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

We claim:

1. A method for producing a structurally modified nickel hydroxide material for the positive electrode of an alkaline electrochemical cell, said method comprising the steps of:

combining a nickel ion solution, an ammonium hydroxide solution, and an alkali metal hydroxide solution, whereby a reaction mixture is formed; and cycling the supersaturation of said reaction mixture by cycling the pH and/or the temperature and/or the pressure of said reaction mixture.

2. The method of claim 1, wherein said cycling the pH step comprises the step of cycling the volumetric amount of said alkali metal hydroxide solution added to said reaction mixture.

3. The method of claim 1, wherein said combining step comprises the steps of:

mixing said nickel ion solution and said ammonium hydroxide solution, whereby a nickel ammonium complex is formed; and mixing said nickel ammonium complex with an alkali metal hydroxide solution.

4. The method of claim 1, wherein the process further comprises the step of adding metal ions of one or more elements selected from the group consisting of Al, Ba, Bi, Ca, Co, Cr, Cu, Fe, In, K, La, Li, Mg, Mn, Na, Nd, Pb, Pr, Ru, Sb, Sc, Se, Sn, Sr, Te, Ti, Y, and Zn.

5. The method of claim 1, wherein said nickel ion solution is selected from the group consisting of a nickel sulfate solution, a nickel nitrate solution, a nickel chloride solution, and mixtures thereof.

6. The method of claim 1, wherein said alkali metal hydroxide is selected from the group consisting of sodium hydroxide, potassium hydroxide, lithium hydroxide, and mixtures thereof.

* * * * *